(12) United States Patent  
LeClerc et al.

(10) Patent No.: US 12,037,125 B1  
(45) Date of Patent: Jul. 16, 2024

(54) STRUCTURE OF AN ELECTRIC AIRCRAFT INCLUDING A BOOM JOINT WITH AN AIRFOIL-SHAPED HOLE, AND METHOD OF MANUFACTURING THE SAME

(71) Applicant: BETA AIR, LLC, South Burlington, VT (US)

(72) Inventors: Jean Sebastien LeClerc, South Burlington, VT (US); David Paradis, South Burlington, VT (US); Luca Valle, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 18/096,995

(22) Filed: Jan. 13, 2023

(51) Int. Cl.
*B64C 3/32* (2006.01)
*B64D 27/24* (2024.01)
*B64D 27/40* (2024.01)

(52) U.S. Cl.
CPC ............... *B64D 27/24* (2013.01); *B64C 3/32* (2013.01); *B64D 27/40* (2024.01)

(58) Field of Classification Search
CPC .......... B64D 27/24; B64D 27/26; B64C 3/32; B64C 39/04; B64C 2211/00
USPC ........................................................ 244/62
See application file for complete search history.

(56) References Cited

U.S. PATENT DOCUMENTS

| 9,764,833 | B1* | 9/2017 | Tighe | B64D 13/006 |
| 10,150,560 | B2 | 12/2018 | Tighe et al. | |
| 10,189,565 | B2 | 1/2019 | Patterson et al. | |
| 10,723,433 | B2* | 7/2020 | Woodworth | B64C 1/069 |
| 10,894,593 | B2 | 1/2021 | Benson et al. | |
| 10,933,971 | B2 | 3/2021 | Woodworth et al. | |
| 11,267,570 | B2 | 3/2022 | Villa et al. | |
| 11,447,246 | B2 | 9/2022 | Kunz et al. | |
| 11,485,488 | B1 | 11/2022 | Armer et al. | |
| 2016/0297520 | A1* | 10/2016 | Sada-Salinas | B64D 27/24 |
| 2017/0106978 | A1* | 4/2017 | Sopper | B65D 5/2033 |
| 2018/0001990 | A1* | 1/2018 | Kossar | B64C 1/36 |

(Continued)

FOREIGN PATENT DOCUMENTS

| CN | 203845000 U | 9/2014 |
| CN | 211391653 U | 9/2020 |

(Continued)

OTHER PUBLICATIONS

Didey, Neopter Aero at MOVE2020, Feb. 24, 2020.
PCT Search Report and Written Opinion mailed Apr. 25, 2024 for PCT application No. PCT/US2024/011489, 60 pages.

*Primary Examiner* — Brady W Frazier
(74) *Attorney, Agent, or Firm* — Lee & Hayes, P.C.; Russell Wagstaff

(57) ABSTRACT

A structure of an electric aircraft is disclosed. The structure may include a wing, wherein the wing is a single component that runs from a left side of the electric aircraft to a right side of the electric aircraft. The wing may include an airfoil. The structure may include at least a boom, wherein the at least a boom is configured to carry at least a propulsor. The at least a boom may include a boom joint attached to the wing. The at least a boom may further include at least a first boom segment attached to a first end of the boom joint. The at least a boom may further include at least a second boom segment attached to a second end of the boom joint.

20 Claims, 6 Drawing Sheets

(56) References Cited

U.S. PATENT DOCUMENTS

| | | | |
|---|---|---|---|
| 2019/0329857 A1* | 10/2019 | Benson | F16B 2/065 |
| 2019/0329882 A1 | 10/2019 | Baity et al. | |
| 2021/0107640 A1 | 4/2021 | Baity et al. | |
| 2021/0339860 A1 | 11/2021 | Agostino et al. | |
| 2021/0403154 A1 | 12/2021 | Tighe et al. | |
| 2022/0009626 A1* | 1/2022 | Baharav | B64C 27/26 |
| 2022/0126994 A1 | 4/2022 | Tang et al. | |
| 2022/0169373 A1* | 6/2022 | Jung | B64C 29/0033 |
| 2022/0234728 A1* | 7/2022 | Groninga | B64D 27/24 |
| 2022/0250739 A1 | 8/2022 | Rimanelli et al. | |
| 2022/0306292 A1 | 9/2022 | Ross et al. | |
| 2022/0315214 A1 | 10/2022 | Mitani et al. | |
| 2023/0039018 A1* | 2/2023 | Rysdyk | B64C 25/68 |

FOREIGN PATENT DOCUMENTS

| | | |
|---|---|---|
| CN | 108657414 B | 12/2020 |
| TW | 201328935 A | 7/2013 |
| WO | 2021234657 | 11/2021 |

* cited by examiner

STRUCTURE OF AN ELECTRIC AIRCRAFT INCLUDING A BOOM JOINT WITH AN AIRFOIL-SHAPED HOLE, AND METHOD OF MANUFACTURING THE SAME

FIELD OF THE INVENTION

The present invention generally relates to the field of electric aircraft. In particular, the present invention is directed to a structure of an electric aircraft.

BACKGROUND

Electric aircraft presents a great promise for the future. Specifically, electric aircraft will allow human flight to be performed without need to burn fossil fuels. The electric aircraft must be made of a stable structure. Existing solutions to make the structure of the electric aircraft stable is not sufficient.

SUMMARY OF THE DISCLOSURE

In an aspect, a structure of an electric aircraft is disclosed. The structure may include a wing, wherein the wing is a single component that runs from a left side of the electric aircraft to a right side of the electric aircraft. The wing may include an airfoil. The structure may include at least a boom, wherein the at least a boom is configured to carry at least a propulsor. The at least a boom may include a boom joint attached to the wing. The at least a boom may further include at least a first boom segment attached to a first end of the boom joint. The at least a boom may further include at least a second boom segment attached to a second end of the boom joint.

In another aspect, a method of manufacturing a structure of an electric aircraft is disclosed. The method may include obtaining a wing, wherein the wing is a single component that runs from a left side of the electric aircraft to a right side of the electric aircraft. The wing may include an airfoil. The method may further include obtaining a boom joint. The method may further include attaching the boom joint to the wing. The method may further include attaching at least a first boom segment of at least a boom to a first end of the boom joint. The method may further include attaching at least a second boom segment of the at least a boom to a second end of the boom joint. The method may further include locating, on the at least a boom, at least a propulsor.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for a structure of an electric aircraft is disclosed. The structure may include a wing, wherein the wing is a single piece that runs from a left side of the electric aircraft to a right side of the electric aircraft. The wing may include an airfoil. The structure may include at least a boom, wherein the at least a boom is configured to carry at least a propulsor. The at least a boom may include a boom joint attached to the wing. The at least a boom may further include at least a first boom segment attached to a first end of the boom joint. The at least a boom may further include at least a second boom segment attached to a second end of the boom joint. Exemplary embodiments illustrating aspects of the present disclosure are described below in the context of several specific examples.

For purposes of description in this disclosure, the terms "up", "down", "forward", "horizontal", "left", "right", "above", "below", "beneath", "top", "bottom" and derivatives thereof shall relate to the invention as oriented in FIG. 3. Furthermore, there is no intention to be bound by any expressed or implied theory presented in the preceding technical field, background, brief summary, or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed in this disclosure are not to be considered as limiting, unless the claims expressly state otherwise.

Figure 1:
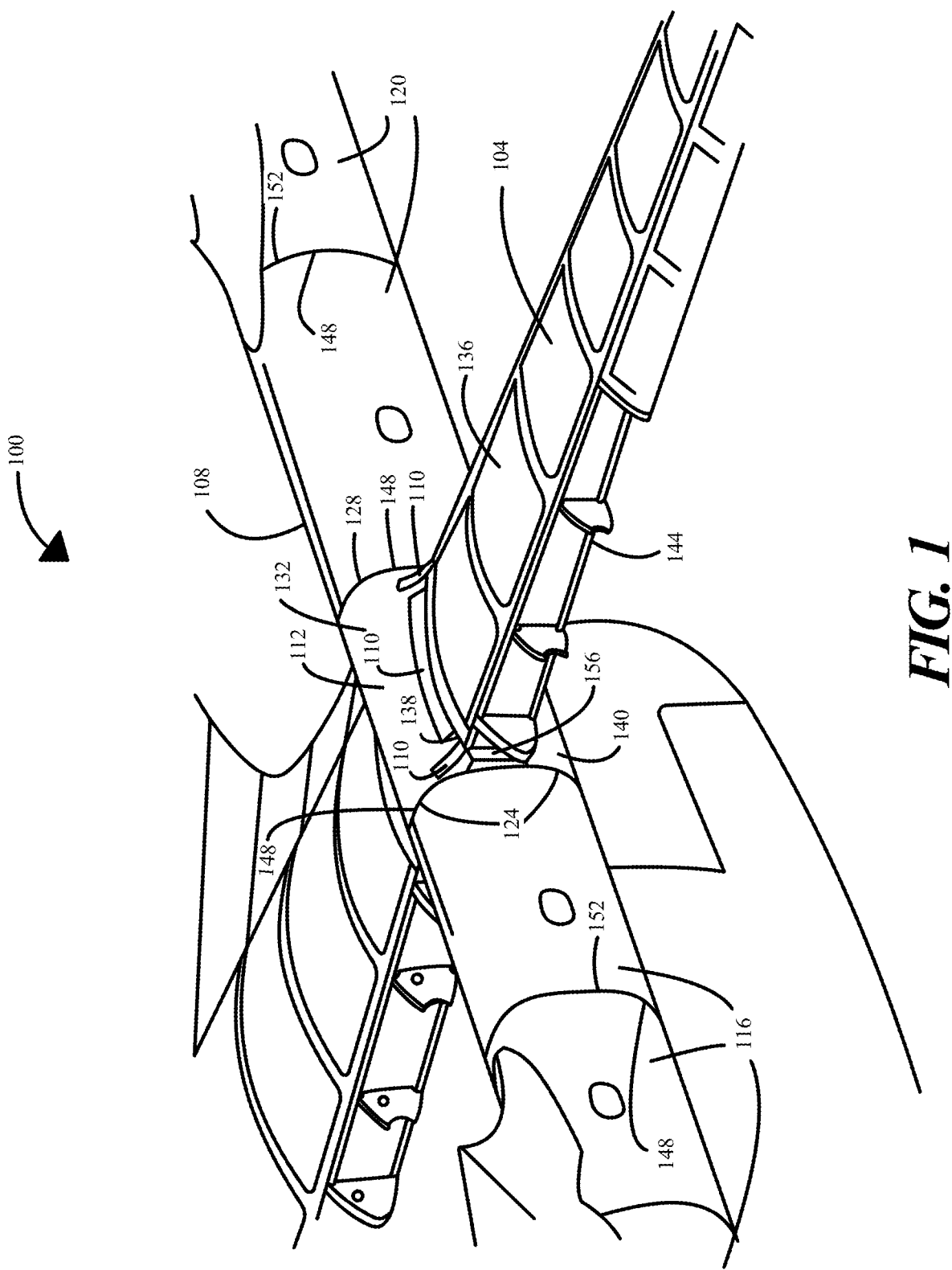
FIG. 1 is an exemplary embodiment of a portion of structure of an aircraft.

Referring now to the drawings, FIG. 1, illustrates an exemplary embodiment of a portion of structure 100 of an aircraft. As used in this disclosure an "aircraft" is vehicle is able to fly. As a non-limiting example, an aircraft may include airplanes, helicopters, airships, blimps, gliders, paramotors, and the like thereof. As used in this disclosure, an "electric aircraft" is an aircraft that is at least primarily electrically powered. Electric aircraft may be capable of rotor-based cruising flight, rotor-based takeoff, rotor-based landing, fixed-wing cruising flight, airplane-style takeoff, airplane-style landing, and/or any combination thereof "Rotor-based flight," as described in this disclosure, is where the aircraft generates lift and propulsion by way of one or more powered rotors coupled with an engine, such as a quadcopter, multi-rotor helicopter, or other vehicle that maintains its lift primarily using downward thrusting propulsors. "Fixed-wing flight," as described in this disclosure, is a mode of flight where the aircraft is primarily generates lift using wings and/or foils that generate lift caused by the aircraft's forward airspeed and the shape of the wings and/or foils, such as airplane-style flight.

Still referring to FIG. 1, in some embodiments, an electric aircraft may be an electric vertical takeoff and landing (eVTOL) aircraft. An "eVTOL," for the purposes of this disclosure, is an electric aircraft that can hover, take off, and land vertically. An eVTOL, as used herein, is an electrically powered aircraft typically using an energy source of a plurality of energy sources to power the aircraft. In order to optimize the power and energy necessary to propel the aircraft, eVTOL may be capable of rotor-based cruising flight, rotor-based takeoff, rotor-based landing, fixed-wing cruising flight, airplane-style takeoff, airplane-style landing, and/or any combination thereof. A "energy source" may include a plurality of energy sources, referred to herein as a module of energy sources. The module may include batteries connected in parallel or in series or a plurality of modules connected either in series or in parallel designed to satisfy both power and energy requirements. Exemplary energy sources are disclosed in detail in U.S. patent application Ser. Nos. 16/948,157 and 16/048,140 both entitled "SYSTEM AND METHOD FOR HIGH ENERGY DENSITY BATTERY MODULE" by S. Donovan et al., which are incorporated in their entirety herein by reference. The eVTOL aircraft may include a flight transition point. The flight transition point, as used in this disclosure, is a point where an eVTOL aircraft changes its flight mode from vertical flight to forward flight. Vertical flight mode, as used in this disclosure, refers to a mode of an aircraft to propel an aircraft in a vertical direction, such as but not limited to vertical takeoff, vertical landing, and the like. Vertical propulsor may be used to perform vertical flight. The vertical propulsor is further disclosed below. Forward flight mode, as used in this disclosure, refers to a mode of an aircraft to propel an aircraft in a horizontal direction, such as but not limited to "airplane" mode. Forward propulsor may be used to perform forward flight. The forward propulsor is further disclosed below. Additionally without limitation, the aircraft disclosed herein may be consistent with an aircraft described with respect to FIG. 3.

Still referring to FIG. 1, structure 100 includes a wing 104. As used in this disclosure, a "wing" is a type of fin that produces lift while moving through a fluid. As a non-limiting example, the fluid may include air. A "lift," for the purposes of this disclosure, is an aerodynamic force, generated by a solid body moving through a fluid perpendicular to the relative freestream velocity. In some embodiments, the lift generated by wing 104 may depend on speed of airflow, density of air, total area of wing 104 and/or segment thereof, and/or an angle of attack between air and wing 104. In some embodiments, wing 104 may be a single piece. In some embodiments, wing 104 may include multiple pieces. In some embodiments, wing 104 may run from a left side of an aircraft to a right side of the aircraft as shown as a non-limiting example in FIG. 3. In some embodiments, wing 104 may be mounted to a fuselage of an aircraft. The fuselage disclosed herein may be consistent with a fuselage described with respect to FIG. 3 As a non-limiting example, wing 104 may be a low wing, wherein the low wing is a wing mounted near or below a bottom of the fuselage. As another non-limiting example, wing 104 may be a mid-wing, wherein the mid wing is a wing mounted approximately halfway up the fuselage. As another non-limiting example, wing 104 may be a high wing, wherein the high wing is a wing mounted on an upper part of the fuselage. As another non-limiting example, wing 104 may be a parasol wing, wherein the parasol wing is a wing that is raised above the upper part of the fuselage, wherein the wing may be raised using cabane struts, pylons, pedestals, or the like. In some embodiments, structure 100 may include one or more wings 104. As a non-limiting example, wing 104 may include a monoplane, wherein the monoplane may include one wing. As another non-limiting examples, wing 104 may be a biplane, wherein the biplane may include two wings of similar size, stacked one above the other. As another non-limiting examples, wing 104 may be a triplane, quadruplane, multiplane, and the like. In some embodiments, wing 104 may include closed wing, wherein the closed wing may include two wings that are merged or joined structurally at or near the tips in some way. In an embodiment, wing 104 may be attached to the fuselage with dihedral angle. As used in this disclosure, "dihedral angle" is an upward angle from a horizontal of a wing of an aircraft. As a non-limiting example, the dihedral angle may include 1°, 2.5°, 3°, 5°, 7.5°, and the like. In another embodiment, wing 104 may be attached to the fuselage with anhedral angle. As used in this disclosure, an "anhedral angle" is a negative dihedral angle, that is a downward angle from a horizontal of a wing. As a non-limiting example, the anhedral angle may include 1°, 2°, 3°, 4°, 5°, 7.5°, and the like. In some embodiments, wing 104 may be flat. As a non-limiting example, the dihedral angle may be 0°. In some embodiments, wing 104 may include a sweep angle. As used in this disclosure, a "sweep angle" is the angle at which a wing is translated backwards or forwards relative to a root chord of the wing. As used in this disclosure, a "root chord" is a place where a wing joins an aircraft's fuselage. As a non-limiting example, wing 104 may include the sweep angle of 5°, 10°, 19°, 25°, 33.5°, 42°, 57°, and the like. In some embodiments, wing 104 may be straight. As a non-limiting example, wing 104 may include the sweep angle of 0°. In some embodiments, wing 104 may include constant chord, wherein the entire wing has parallel leading edges and trailing edges. In some embodiments, wing 104 may include tapered wing, wherein the wing narrows towards the tip. In some embodiments, wing 104 may include elliptical wing, wherein leading edges and trailing edges of wing 104 are curved such that the chord length varies elliptically with respect to the wingspan.

Still referring to FIG. 1, wing 104 includes an airfoil. An "airfoil," as used in this disclosure, is a cross-sectional shape of an object whose motion through a gas is capable of generating lift. As a non-limiting example, the object may include wing 104, a sail, blades of propeller, rotor, or turbine, or the like. In an embodiment, wing 104 may include one airfoil. In another embodiment, wing 104 may include a plurality of airfoils. In an embodiment, wing 104 may include a plurality of airfoils in different chord lengths. As used in this disclosure, "chord length" is the length of a chord line. As used in this disclosure, a "chord line" is a straight light connecting leading edge and trailing edge. As used in this disclosure, a "leading edge" is the foremost edge of an airfoil. As used in this disclosure, a "trailing edge" is a rear edge of an airfoil. As a non-limiting example, wing 104 may include the chord length of 1-inch, 3-inch, 5-inch, 10-inch, and the like. In another embodiment, wing 104 may include a plurality of airfoils in different shapes of cambers. As used in this disclosure, a "camber" is curvature of an airfoil from the leading edge to the trailing edge. As a non-limiting example, the camber may include a concave camber. As another non-limiting example, the camber may include a convex camber. In an embodiment, the camber may include an upper camber, wherein the upper camber is a curve of the upper surface of the airfoil. In another embodiment, the camber may include a lower camber, wherein the lower camber is a curve of the lower surface of the airfoil. In some embodiments, the camber may include a mean camber line, wherein the mean camber line is an imaginary line which lies halfway between the upper camber and the lower camber of the airfoil and intersects the chord line at the leading and trailing edges. In an embodiment, the airfoil may include symmetric airfoil, wherein the upper camber and the lower camber are symmetric. In another embodiment, the airfoil may include asymmetric airfoil, wherein the upper camber and the lower camber include different curvature. In some embodiments, a thickness of the airfoil may be measured using the mean camber line, wherein the thickness may be measured perpendicular to the mean camber line. In another embodiment, the thickness of the airfoil may be measured using the chord line, wherein the thickness may be measured perpendicular to the chord line.

Still referring to FIG. 1, in some embodiments, wing 104 may include an aileron. An "aileron," as used in this disclosure, is a hinged surface which forms part of the trailing edge of a wing in a fixed-wing aircraft, and which may be moved with mechanical means such as without limitation servomotors, mechanical linkages, or the like. As a non-limiting example, the aileron may include single acting ailerons, wingtip ailerons, frise ailerons, differential ailerons. In an embodiment, the aileron may be mechanically coupled to an aircraft. In some embodiments, wing 104 may include a flap. As used in this disclosure, a "flap" is a high-lift device on a trailing edge of an aircraft wing used to reduce stalling speed of an aircraft wing at a given weight. A "high-lift device," for the purposes of this disclosure, is a component or mechanism on an aircraft's wing that increases amount of lift produced by the wing. The device may be a fixed component, or a movable mechanism which is deployed when required. Common movable high-lift devices may include flaps and slats. A "slat," for the purposes of this disclosure, is a high-lift device on a leading edge of an aircraft wing used to allow the wing to produce more lift. The fixed devices may include leading-edge slots, leading edge root extensions, and boundary layer control systems. The flaps, as a non-limiting example, may include plain flaps, split flap, slotted flaps, fowler flaps, leading-edge flap, continuous trailing-edge flap, and the like thereof. "Plain flaps," as used in this disclosure, are a hinged portion of a trailing edge, which increase curvature of a wing and lift by lowering the trailing edge of the wing. "Split flaps," as used in this disclosure, are hinged at bottom of a wing. The split flaps may generate drag by disturbing airflow on the underside of wing 104. "Slotted flaps," as used in this disclosure, are similar to plain flap, but have a slot between trailing edge of a wing and a flap. Slotted flaps may allow high-energy air to flow from underneath a wing up and over a flap to help prevent airflow separation. "Flow separation," as used in this disclosure, is a detachment of a boundary layer from a surface into a wake. "Fowler flaps," as used in this disclosure, are flaps that move rearward and downward increasing wing area and curvature. In some embodiments, extending the flaps may increase a camber of a wing, raising maximum lift coefficient or upper limit to a lift a wing can generate. This may allow the aircraft to generate the required lift at a lower speed, reducing stall speed. "Stall speed," as used in this disclosure, is the minimum speed at which an aircraft must fly to produce a lift. A "stall," as used in this disclosure, is a reduction in lift coefficient generated by an airfoil as angle of attack increases. The stall may occur when the critical angle of attack of an airfoil is exceeded. "Critical angle of attack," as used in this disclosure, is angle of attack which produces maximum lift coefficient. In an embodiment, an aircraft's weight, acceleration, altitude may affect stall speed.

Still referring to FIG. 1, structure 100 includes at least a boom 108. As used in this disclosure, a "boom" is a structural component of an aircraft that carries one or more components of an aircraft. As a non-limiting example, a component may include a propulsor, a battery pack, and the like. The propulsor disclosed herein is further described below and may be consistent with a propulsor described with respect to FIG. 4. In some embodiments, structure 100 may include a plurality of the at least a boom 108. As a non-limiting example, structure 100 may include two the at least a boom 108, three the at least a boom 108, and the like. In an embodiment, the at least a boom 108 may include a cylindrical body. As used in this disclosure, a "cylindrical body" refers to an object that has a shape of cylinder. n another embodiment, the at least a boom 108 may include a cuboid body. In some embodiments, the at least a boom 108 may be hollow. In an embodiment, the at least a boom 108 may be oriented substantially perpendicular to a wingspan of wing 104 as shown as a non-limiting example in FIG. 3 As used in this disclosure, a "wingspan" is an imaginary line drawn from a tip of one wing to a tip of the other. The tip of wing 104 is further described below. In some embodiments, the wingspan may be used to measure a length of wing 104. In some embodiments, the wingspan may be used to orient the at least a boom 108. In another embodiment, the at least a boom 108 may be oriented diagonally to the wingspan of wing 104. In some embodiments, the at least a boom 108 may be attached to at least a portion of a tail of the aircraft. As used in this disclosure, a "tail" of an aircraft is a structure at the rear of an aircraft that provides stability during flight. The tail of the aircraft disclosed herein may be consistent with a tail described with respect to FIG. 3.

Still referring to FIG. 1, in some embodiments, at least a boom 108 is configured to carry at least a propulsor. As used in this disclosure, a "propulsor" is a component or device used to propel a craft by exerting force on a fluid medium, which may include a gaseous medium such as air or a liquid medium. As a non-limiting example, the craft may include an aircraft, an electric aircraft, an eVTOL aircraft, and the like. In some embodiments, the propulsor may include a rotor, propeller, a blade, or a blade arrangement. In a non-limiting example, the propulsor may be a lift propulsor. As used in this disclosure, a "lift propulsor" is a propulsor that provides vertical lift to an aircraft. The lift disclosed herein is described further above. In some embodiments, the vertical lift may be provided during transition of the aircraft between vertical and horizontal modes of flight, along with a forward thrust. The propulsor disclosed herein may be consistent with a propulsor described with respect to FIG. 4.

Still referring to FIG. 1, in some embodiments, at least a boom 108 may include a structure. The structure of boom 108 may be consistent with the fuselage structures disclosed below with respect to FIG. 3. The boom structure may include a truss, geodesic construction, monocoque construction, semi-monocoque construction, and the like thereof. The truss disclosed herein is further described in respect to FIG. 3. The geodesic construction disclosed herein is further described in respect to FIG. 3. The semi-monocoque construction disclosed herein is further described in respect to FIG. 3. The boom structure may be comprised of one or more metallic compounds such as aluminum, steel, titanium, composites, and the like thereof. In one or more embodiments, boom structure may include a plurality of structural elements. In other embodiments, the boom structure may include a plurality of airframes.

Still referring to FIG. 1, in some embodiments, at least a boom 108 may include one or more boom segments. As used in this disclosure, a "boom segment" is a segment of a boom of an aircraft. In some embodiments the one or more boom segments may be mechanically connected to each other to form the at least a boom 108. As used in this disclosure, "mechanically coupled," also called "mechanically connected" may include any means of mechanical fastening and/or connection. In some embodiments, the mechanical coupling may be done using coupling material 110. As used in this disclosure, a "coupling material" is any material that is used to mechanically couple two objects. As a non-limiting example, coupling material 110 may include a panel, a sheet, and the like. In an embodiment, coupling material 110 may be temporary. As a non-limiting example, coupling material 110 may include temporarily fastening using bolts, rivets, nuts, screws, and the like. In another embodiment, coupling material 110 may be permanent. As a non-limiting example, coupling material 110 may include permanent fastening, such as welding, brazing, and the like. Mechanical coupling may include, for example and without limitation, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof.

Still referring to FIG. 1, one or more boom segments includes boom joint 112. As used in this disclosure, a "boom joint" is a device that connects a wing and a boom of an aircraft. As a non-limiting example, boom joint 112 may connect wing 104 and the at least a boom 108. In some embodiments, boom joint 112 may be mechanically coupled to wing 104. As a non-limiting example, boom joint 112 may be fixed to wing 104 using coupling material 110. As a non-limiting example, coupling material 110 may include temporary fastening, such as bolts, rivets, nuts, screws, and the like. As another non-limiting example, coupling material 110 may be fixed to wing 104 using permanent fastening, such as welding, brazing, and the like. In an embodiment, at least a boom 108 may be attached to wing 104 close to root chord of wing 104. In another embodiment, the at least a boom 108 may be attached to wing 104 close to a tip of wing 104. As used in this disclosure, a "tip" of a wing is the part of the wing that is most distant from the fuselage of an aircraft. In some embodiments, the at least a boom 108 may be attached to in the middle of the root chord and the tip of wing 104. In some embodiments, the at least a boom 108 may be replaced by another boom by disabling the attachment of the at least a boom 108 to wing 104. The removal of the at least a boom 108 from wing 104 is further described below. In an embodiment, boom joint 112 may be located in the middle of one or more boom segments. As a non-limiting example, boom joint 112 may be located in between first boom segment 116 and second boom segment 120. First boom segment 116 and second boom segment 120 are further described below. In another embodiment, boom joint 112 may be located on the front portion of the at least a boom 108. In some embodiments, boom joint 112 may be located on the back portion of the at least a boom 108. In an embodiment, boom joint 112 may be longer than first boom segment 116. In another embodiment, boom joint 112 may be longer than second boom segment 120. In some embodiments, boom joint 112 may be shorter than first boom segment 116. In some embodiments, boom joint 112 may be longer than second boom segment 120. In some embodiments, the length of boom joint 112 may be same as first boom segment 116. In some embodiments, the length of boom joint 112 may be same as second boom segment 120.

Still referring to FIG. 1, in an embodiment, boom joint 112 may include a single piece. In some embodiments, a length between first end 124 and second end 128 of the single piece of boom joint 112 may be longer than a chord length of wing 104. As a non-limiting example, the length between first end 124 and second end 128 of boom joint 112 may be 30-inches while the chord length of wing 104 may be 24-inches. In some embodiments, the single piece of boom joint 112 may include hole 208. As used in this disclosure, a "hole" of a boom joint is an aperture of a boom joint. In some embodiments, hole 208 may include a shape of an airfoil of wing 104. In some embodiments, hole 208 may include a thickness of the airfoil of wing 104. As a non-limiting example, the thickness of hole 208 may be 10-inch while the chord length of the airfoil of wing 104 is 10-inch. In some embodiments, hole 208 may include a length of the airfoil of wing 104. As a non-limiting example, the length of hole 208 may be 24-inches while the chord length of the airfoil of wing 104 is 24-inches. The airfoil disclosed herein is further described above. In some embodiments, hole 208 may be in the middle of boom joint 112. In some embodiments, hole 208 may be larger than the airfoil of wing 104 so as to allow wing 104 to pass through. In some embodiments, boom joint 112 may include two holes 208, wherein a first hole is placed on opposite of a second hole. In some embodiments, boom joint 112 may be inserted to wing 104 through hole 208 thus at least a boom 108 may be attached to wing 104. As a non-limiting example, boom joint 104 may be inserted to wing 104 from the first hole to the second hole. In some embodiments, boom joint 112 that is inserted to wing 104 through hole 208 may be mechanically coupled to wing 104. As a non-limiting example, boom joint 112 may be fixed to wing 104 using coupling material 110. As a non-limiting example, coupling material 110 may include temporary fastening, such as bolts, rivets, nuts, screws, and the like. As another non-limiting example, coupling material 110 may be fixed to wing 104 using permanent fastening, such as welding, brazing, and the like. In some embodiments, the at least a boom 108 may be removed from wing 104 through hole 208 of boom joint 112. In some embodiments, the at least a boom 108 that is removed from wing 104 may be replaced by another the at least a boom 108. In some embodiments, boom joint 112 of the at least a boom 108 that is removed from wing 104 may be replaced by another boom joint 112.

Still referring to FIG. 1, in another embodiment, boom joint 112 may include two pieces. In some embodiments, boom joint 112 may include any number of pieces. As a non-limiting example, boom joint 112 may include three pieces, four pieces, five pieces, and the like. In an embodiment, the two pieces of boom joint 112 may include upper joint 132. As used in this disclosure, an "upper joint" is a top portion of a boom joint. In an embodiment, third end 138 of upper joint 132 may be indented and/or curved. As a non-limiting example, a portion of third end 138 of upper joint 132 may be indented and/or curved in a shape of top surface 136 of wing 104. In another embodiment, third end 138 of upper joint 132 may be flat. In another embodiment, two pieces of boom joint 112 may include lower joint 140. As used in this disclosure, a "lower joint" is a bottom portion of the boom joint. In an embodiment, third end 138 of lower joint 140 may be indented and/or curved. As a non-limiting example, a portion of third end 138 of lower joint 140 may be indented and/or curved in a shape of bottom surface 144 of wing 104. In another embodiment, lower joint 140 may be flat. In some embodiments, a length between first end 124 and second end 128 of the two pieces of boom joint 112 may be longer than a chord length of wing 104. As a non-limiting example, the length between first end 124 and second end 128 of upper joint 132 of boom joint 112 may be 30-inch while the chord length of wing 104 is 24-inch. As another non-limiting example, the length between first end 124 and second end 128 of lower joint 140 of boom joint 112 may be 30-inch while the chord length of wing 104 is 24-inch. In some embodiments, the length between first end 124 and second end 128 of boom joint may be same as the chord length of wing 104. As a non-limiting example, the length between first end 124 and second end 128 of upper joint 132 of boom joint 112 may be 24-inch while the chord length of wing 104 is 24-inch.

Still referring to FIG. 1, in some embodiments, there may be a gap 224 between upper joint 132 and lower joint 140. In some embodiments, boom joint 112 may be opened by separating upper joint 132 and lower joint 140. As a non-limiting example, boom joint 112 may be opened by widening the gap 224. In some embodiments, wing 104 may be inserted through the gap 224 opened by separating upper joint 132 and lower joint 140. In some embodiments, wing 104 may be slid into the gap 224 from the side of the gap 224 between upper joint 132 and lower joint 140. In some embodiments, attaching boom joint 112 to wing 104 may include closing boom joint 112. As a non-limiting example, boom joint 112 may be closed by narrowing the gap 224. In some embodiments, upper joint 132 may be attached to top surface 136 of wing 104. In some embodiments, lower joint 140 may be attached to bottom surface 144 of wing 104. In some embodiments, upper joint 132 may be mechanically coupled to top surface 136 of wing 104. As a non-limiting example, upper joint 132 may be fixed to top surface 136 of wing 104 using coupling material 110. As a non-limiting example, upper joint 132 may be fixed to top surface 136 of wing 104 using coupling material 110 that is temporary fastening, such as bolts, rivets, nuts, screws, and the like. As another non-limiting example, upper joint 132 may be fixed to top surface 136 of wing 104 using coupling material 110 that is permanent fastening, such as welding, brazing, and the like. In some embodiments, lower joint 140 may be mechanically coupled to bottom surface 144 of wing 104. As a non-limiting example, lower joint 140 may be fixed to bottom surface 144 of wing 104 using temporary fastening, such as bolts, rivets, nuts, screws, and the like. As another non-limiting example, lower joint 140 may be fixed to bottom surface 144 of wing 104 using permanent fastening, such as welding, brazing, and the like. In some embodiments, the at least a boom 108 may be removed from wing 104, such as upper joint 132 and lower joint 140, through the gap 224. In some embodiments, upper joint 132 and lower joint 140 that are removed from wing 104 may be replaced by another upper joint 132 and lower joint 140.

Still referring to FIG. 1, one or more boom segments includes first boom segment 116. In some embodiments, first boom segment 116 may include one or more first boom segments 116. As a non-limiting example, first boom segment 116 may include one first boom segment 116, two first boom segments 116, three first boom segments 116, and the like. In some embodiments, first boom segment 116 may be attached to boom joint 112. As a non-limiting example, first side 148 of first boom segment 116 may be attached to first end 124 of a single piece of boom joint 112 as shown in FIG. 2A. As another non-limiting example, first side 148 of first boom segment 116 may be attached to first end 124 of upper joint 132 and first end 124 of lower joint 140 as shown in FIG. 2C. In some embodiments, first boom segment 116 may be mechanically coupled to boom joint 112. In some embodiments, first boom segment 116 may be mechanically coupled to boom joint 112 using coupling material 110. As a non-limiting example, first boom segment 116 may be mechanically coupled to boom joint 112 using coupling material 110 that is temporary fastening, such as bolts, rivets, nuts, screws, and the like. As another non-limiting example, first boom segment 116 may be mechanically coupled to boom joint 112 using coupling material 110 that is permanent fastening, such as welding, brazing, and the like. In some embodiments, first boom segment 116 may be removed from at least a boom 108. In some embodiments, first boom segment 116 that is removed from the at least a boom 108 may be replaced by another first boom segment 116. In some embodiments, first boom segment 116 may be attached to another first boom segment 116. As a non-limiting example, second side 152 of first boom segment may be attached to first side 148 of another first boom segment 116. In some embodiments, first boom segment 116 may be mechanically coupled to another first boom segment 116. In some embodiments, first boom segment 116 may be mechanically coupled to first boom segment 116 using coupling material 110. As a non-limiting example, first boom segment 116 may be mechanically coupled to another first boom segment 116 using coupling material 110 that is temporary fastening, such as bolts, rivets, nuts, screws, and the like. As another non-limiting example, first boom segment 116 may be mechanically coupled to another first boom segment 116 using coupling material 110 that is permanent fastening, such as welding, brazing, and the like. In some embodiments, at least a portion of first boom segments 116 may be configured to carry a propulsor.

Still referring to FIG. 1, one or more boom segments includes second boom segment 120. In some embodiments, second boom segment 120 may include one or more second boom segments 120. As a non-limiting example, second boom segment 120 may include one second boom segment 120, two second boom segments 120, three second boom segments 120, and the like. In some embodiments, second boom segment 120 may be attached to boom joint 112. As a non-limiting example, first side 148 of second boom segment 120 may be attached to first end 124 of a single piece of boom joint 112 as shown in FIG. 2A. As another non-limiting example, first side 148 of second boom segment 120 may be attached to first end 124 of upper joint 132 and first end 124 of lower joint 140 as shown in FIG. 2C. In some embodiments, second boom segment 120 may be mechanically coupled to boom joint 112. In some embodiments, second boom segment 120 may be mechanically coupled to boom joint 112 using coupling material 110. As a non-limiting example, second boom segment 120 may be mechanically coupled to boom joint 112 using coupling material 110 that is temporary fastening, such as bolts, rivets, nuts, screws, and the like. As another non-limiting example, second boom segment 120 may be mechanically coupled to boom joint 112 using coupling material 110 that is permanent fastening, such as welding, brazing, and the like. In some embodiments, second boom segment 120 may be removed from at least a boom 108. In some embodiments, second boom segment 120 that is removed from the at least a boom 108 may be replaced by second boom segment 120.

In some embodiments, second boom segment 120 may be attached to another second boom segment 120. As a non-limiting example, second side 152 of second boom segment may be attached to first side 148 of another second boom segment 120. In some embodiments, second boom segment 120 may be mechanically coupled to another second boom segment 120. In some embodiments, second boom segment 120 may be mechanically coupled to another second boom segment 120 using coupling material 110. As a non-limiting example, second boom segment 120 may be mechanically coupled to another second boom segment 120 using coupling material 110 that is temporary fastening, such as bolts, rivets, nuts, screws, and the like. As another non-limiting example, second boom segment 120 may be mechanically coupled to another second boom segment 120 using coupling material 110 that is permanent fastening, such as welding, brazing, and the like. In some embodiments, at least a portion of second boom segments 120 may be configured to carry a propulsor. In some embodiments, the at least a boom 108 may include second gap 156, wherein second gap 156 is a gap between upper joint 132, lower joint 140, wing 104 that is attached to upper joint 132 and lower joint 140, and first boom segment 116 and/or second boom segment 120.

Referring now to FIG. 2A-2D, exemplary embodiments of a portion 200 of at least a boom 108 of an electric aircraft is disclosed. In some embodiments, the at least a boom 108 may include a plurality of boom segments. In some embodiments, the boom segments may include a first boom segment 116. In some embodiments, the boom segments may include a second boom segment 120. In some embodiments, the boom segments may include boom joint 112. In some embodiments, first boom segment 116 may be attached to first end 124 of boom joint 112. As a non-limiting example, first side 148 of first boom segment 116 may be attached to first end 124 of boom joint 112. In some embodiments, first boom segment 116 may include a plurality of first boom segments 116. As a non-limiting example, second side 152 of one first boom segment 116 may be attached to first side 148 of another first boom segment 116. In some embodiments, second boom segment 120 may be attached to second end 128 of boom joint 112. As a non-limiting example, first side 148 of second boom segment 120 may be attached to second end 128 of boom joint 112. In some embodiments, second boom segment 120 may include a plurality of second boom segments 120. As a non-limiting example, second side 152 of one second boom segment 120 may be attached to first side 148 of another second boom segment 120.

Still referring to FIG. 2A-2D, FIG. 2A illustrates a portion 200 of an assembled at least a boom 108. In some embodiments, boom joint 112 may include a single piece 204. In some embodiments, the single piece of boom joint 112 may include hole 208. In some embodiments, hole 208 may include a shape of an airfoil of a wing of the aircraft. In some embodiments, hole 208 may include a length corresponding to the chord length the wing of the aircraft. In some embodiments, hole 208 may include a thickness of the airfoil of the wing of the aircraft. In some embodiments, hole 208 may be longer than the chord length of the wing. In some embodiments, hole 208 may be thicker than the airfoil of the wing. In some embodiments, a length of hole 208 may be same as the length of boom joint 112. In some embodiments, the length of boom joint 112 and the length of hole 208 may be smaller than the length of boom joint 112. In some embodiments, boom joint 112 may be inserted to the wing through hole 208 of boom joint 112. In some embodiments, the boom joint 112 may be mechanically coupled to the wing after the insertion. As a non-limiting example, the boom joint 112 may be mechanically coupled to the wing using coupling material 110—as non-limiting examples, temporary fastening, such as bolts, rivets, nuts, screws, and the like. As another non-limiting example, the boom joint 112 may be mechanically coupled to the wing using coupling material 110 that is permanent fastening, such as welding, brazing, and the like. In some embodiments, the wing may be removed from boom joint 112 through hole 208.

Figure 2B:
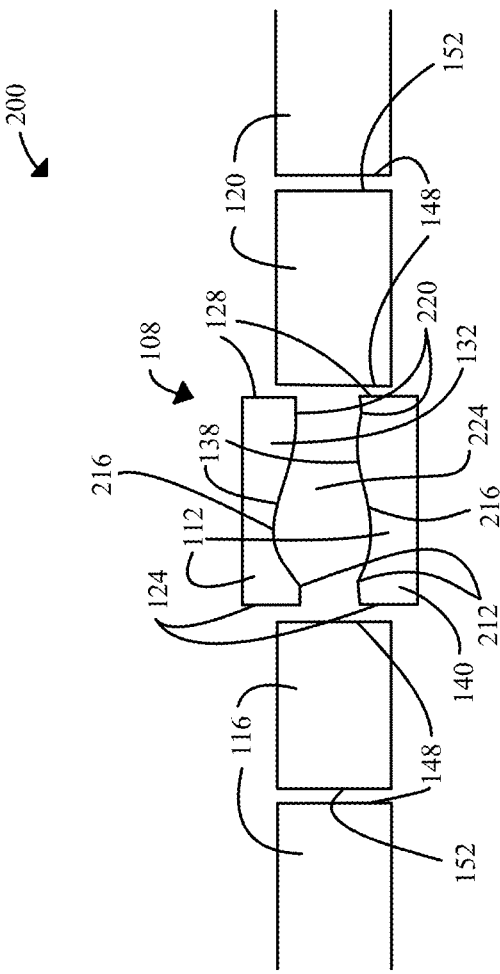
FIG. 2B illustrates a portion of a disassembled boom of an aircraft with boom joint consists of two pieces.
Figure 2A:
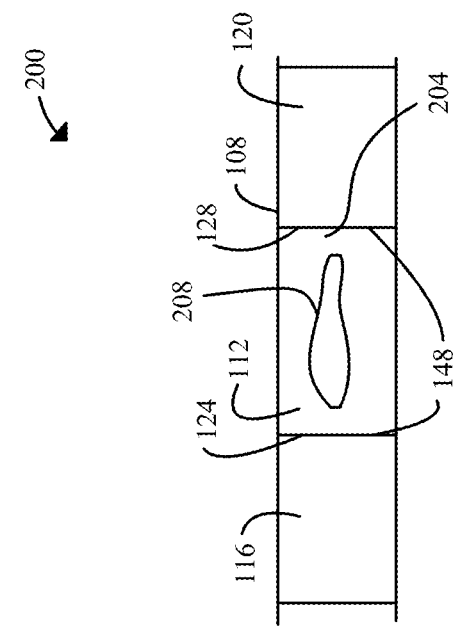
FIG. 2A illustrates a portion of an assembled boom of an aircraft with boom joint consists of one piece.
Figure 2D:
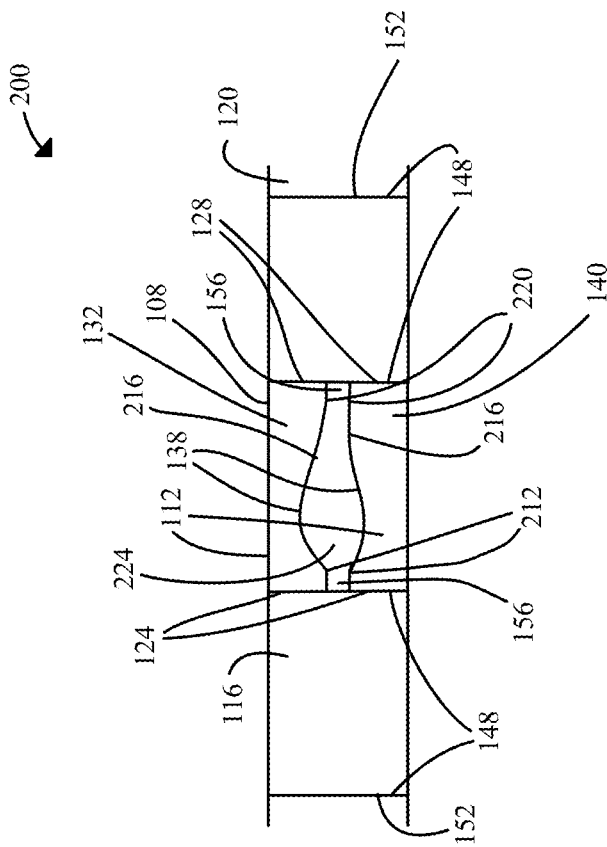
FIG. 2D illustrates a portion of an assembled boom with boom joint consists of two pieces and a second gap.
Figure 2C:
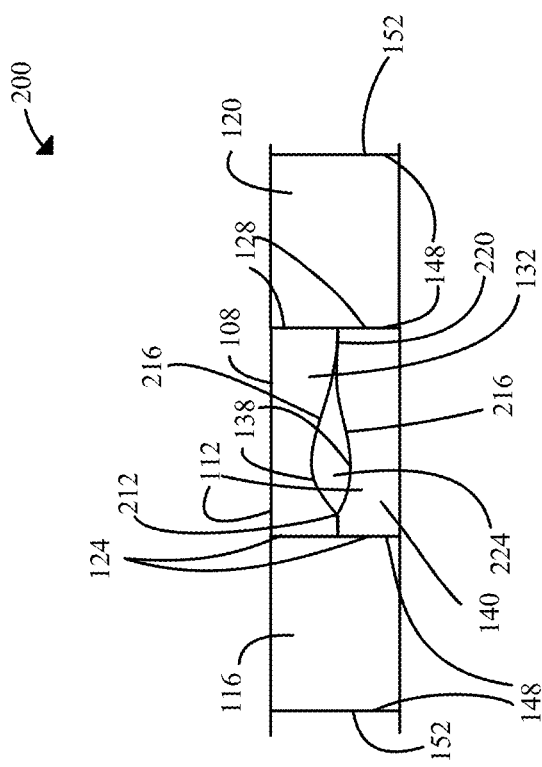
FIG. 2C illustrates a portion of an assembled boom with boom joint consists of two pieces.

Still referring to FIG. 2A-2D, FIG. 2B illustrates a portion 200 of a disassembled boom 108. FIG. 2B illustrates at least a portion 200 of disassembled the at least a boom 108. In some embodiments, boom joint 112 may include two pieces. In some embodiments, the two pieces of boom joint 112 may include upper joint 132. In some embodiments, the two pieces of boom joint 112 may include lower joint 140. In some embodiments, third end 138 of upper joint 132 may include indented surface. As used in this disclosure, an "indented surface" is a surface that is indented or curved. As a non-limiting example, third end 138 of upper joint 132 may be indented or curved in a shape of an airfoil of a wing of an aircraft. In some embodiments, third end 138 of upper joint 132 may be attached to a top surface 136 of wing 104. In an embodiment, a length between start point 212 of an indented surface 216 of third end 138 and end point 220 of the indented surface 216 may be shorter than a total length of third end 138 of boom joint 112. In another embodiment, a length between start point 212 of an indented surface 216 of third end 138 and end point 220 of the indented surface 216 may be same as the total length of third end 138 of boom joint 112. In some embodiments, third end 138 of lower joint 140 may include indented surface. As a non-limiting example, third end 138 of lower joint 140 may be indented or curved in a shape of the airfoil of the wing of the aircraft. In some embodiments, third end 138 of lower joint 140 may be attached to a bottom surface of wing 104. In some embodiments, boom joint 112 may be opened by separating upper joint 132 and lower joint 140. As a non-limiting example, boom joint 112 may be opened by widening gap 224. In some embodiments, wing 104 may be inserted through the gap 224 opened by separating upper joint 132 and lower joint 140. In some embodiments, wing 104 may be slid into the gap 224 from the side of the gap 224 between upper joint 132 and lower joint 140. In some embodiments, attaching boom joint 112 to wing 104 may include closing boom joint 112. As a non-limiting example, boom joint 112 may be closed by narrowing the gap 224. In some embodiments, top surface 136 of wing 104 may be mechanically coupled to upper joint 132. In some embodiments, bottom surface 144 of wing 104 may be mechanically coupled to lower joint 140. In some embodiments, the at least a boom 108 may be removed from wing 104, such as upper joint 132 and lower joint 140, through the gap 224. In some embodiments, wing 104 may be inserted to boom joint 112 from a side of boom joint 112 through gap 224.

Still referring to FIG. 2A-2D, FIG. 2C and FIG. 2D illustrates a portion 200 of an assembled at least a boom 108 with boom joint 112 consists of upper joint 132 and lower joint 140. In some embodiments, boom joint 112 may include second gap 156 as shown in FIG. 2D. In an embodiment, second gap 156 may include empty surface. In another embodiment, second gap 156 may include blocked surface.

Figure 3:
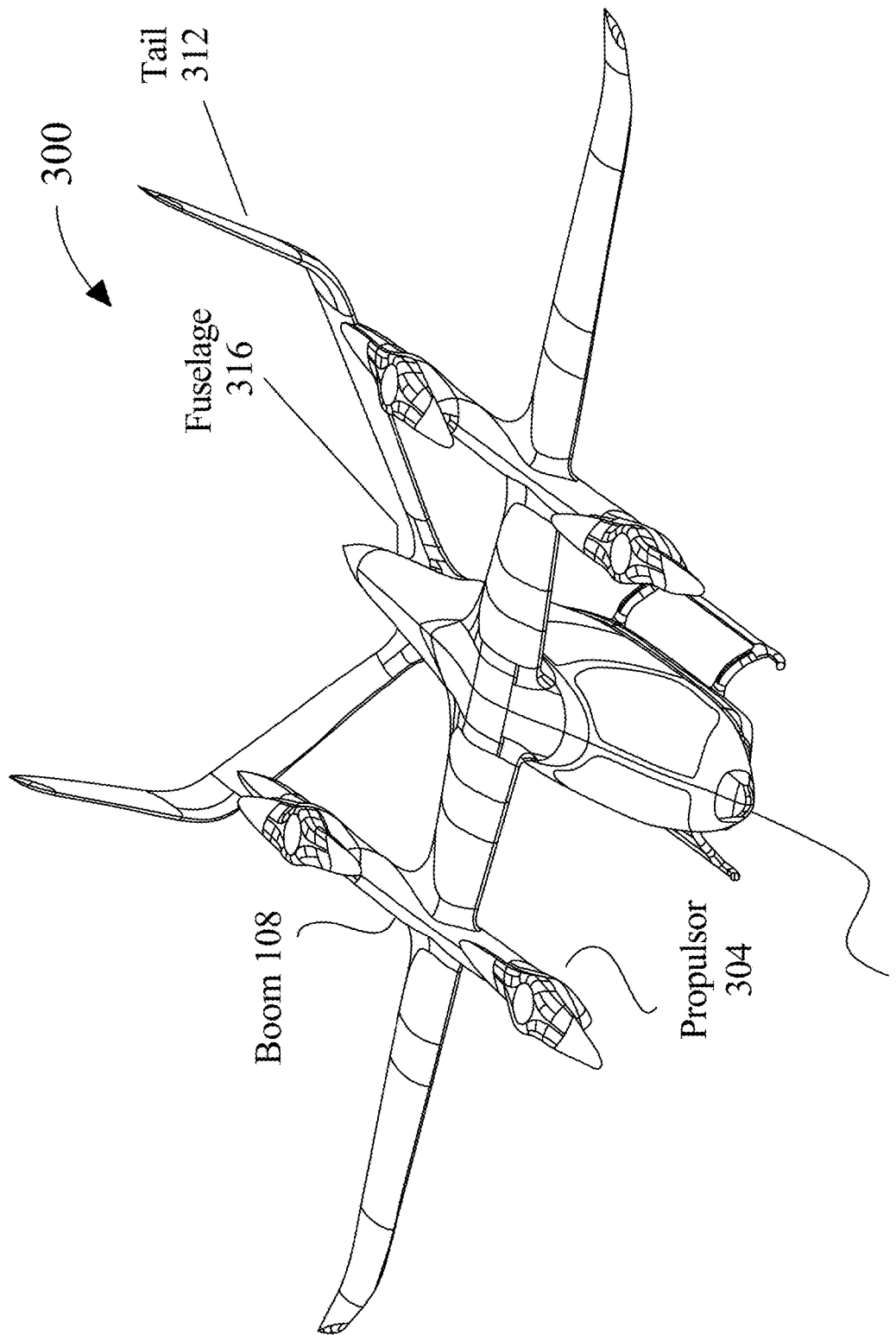
FIG. 3 is an exemplary embodiment of an electric aircraft with a propulsor.

Referring now to FIG. 3, an exemplary embodiment of an electric aircraft 300 with a propulsor 304 is illustrated in accordance with one or more embodiments of the present disclosure. Aircraft 300 may include an electrically powered aircraft. In embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. Electric aircraft may include one or more manned and/or unmanned aircrafts. Electric aircraft may include one or more all-electric short takeoff and landing (eSTOL) aircrafts. For example, and without limitation, eVTOL aircrafts may accelerate plane to a flight speed on takeoff and decelerate plane after landing. In an embodiment, and without limitation, electric aircraft may be configured with an electric propulsion assembly. Electric propulsion assembly may include any electric propulsion assembly as described in U.S. Nonprovisional application Ser. No. 16/603,325, filed on Dec. 4, 3019, and entitled "AN INTEGRATED ELECTRIC PROPULSION ASSEMBLY," the entirety of which is incorporated herein by reference.

Still referencing FIG. 3, in some embodiments, an eVTOL may use an energy source of a plurality of energy sources to power aircraft. To optimize the power and energy necessary to propel aircraft 300, eVTOL may be capable of rotor-based cruising flight, rotor-based takeoff, rotor-based landing, fixed-wing cruising flight, airplane-style takeoff, airplane style landing, and/or any combination thereof. Rotor-based flight, as described herein, is where the aircraft generates lift and propulsion by way of one or more powered rotors or blades coupled with an engine, such as a "quad-copter," multi-rotor helicopter, or other vehicle that maintains its lift primarily using downward thrusting propulsors.

Still referencing FIG. 3, and in one or more embodiments, aircraft 300 may include motor, which may be mounted on a structural feature of an aircraft. Design of motor may enable it to be installed external to the structural member (such as a boom, nacelle, or fuselage) for easy maintenance access and to minimize accessibility requirements for the structure. This may improve structural efficiency by requiring fewer large holes in the mounting area. This design may include two main holes in the top and bottom of the mounting area to access bearing cartridge. Further, a structural feature may include a component of aircraft 300. For example, and without limitation structural feature may be any portion of a vehicle incorporating motor, including any vehicle as described below. As a further non-limiting example, a structural feature may include without limitation a wing, a spar, an outrigger, a fuselage, or any portion thereof; persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, at least a structural feature may be constructed from additively manufactured polymer material with a carbon fiber exterior; aluminum parts or other elements may be enclosed for structural strength, or for purposes of supporting, for instance, vibration, torque or shear stresses imposed by at least propulsor 304. Persons skilled in the art, upon reviewing the entirety of this disclosure, will be aware of various materials, combinations of materials, and/or constructions techniques.

Still referring to FIG. 3, aircraft 300 may include a propulsor 304. Propulsor may include any device or component that consumes electrical power on demand to propel an electric aircraft in a direction or other vehicle while on ground or in-flight. For example, and without limitation, propulsor may include a rotor, propeller, paddle wheel, and the like thereof. In an embodiment, propulsor may include a plurality of blades. As used in this disclosure a "blade" is a propeller that converts rotary motion from an engine or other power source into a swirling slipstream. In an embodiment, blade may convert rotary motion to push the propeller forwards or backwards. In an embodiment, propulsor may include a rotating power-driven hub, to which are attached several radial airfoil-section blades such that the whole assembly rotates about a longitudinal axis. In one or more embodiments, a rotor may be used in a motor of a lift propulsor. For the purposes of this disclosure, a "lift propulsor" is a propulsor that produces lift. In one or more exemplary embodiments, propulsor 304 may include a vertical propulsor or a forward propulsor. A forward propulsor may include a propulsor configured to propel aircraft 300 in a forward direction. A vertical propulsor may include a propulsor configured to propel aircraft 300 in an upward direction. One of ordinary skill in the art would understand upward to comprise the imaginary axis protruding from the earth at a normal angle, configured to be normal to any tangent plane to a point on a sphere (i.e. skyward). In an embodiment, vertical propulsor can be a propulsor that generates a substantially downward thrust, tending to propel an aircraft in an opposite, vertical direction and provides thrust for maneuvers. Such maneuvers can include, without limitation, vertical take-off, vertical landing, hovering, and/or rotor-based flight such as "quadcopter" or similar styles of flight.

Still referencing FIG. 3, and in an embodiment, propulsor 304 may include a propeller, a blade, or the like. The function of a propeller is to convert rotary motion from an engine or other power source into a swirling slipstream which pushes the propeller forwards or backwards. The propulsor may include a rotating power-driven hub, to which are attached several radial airfoil-section blades such that the whole assembly rotates about a longitudinal axis. The blade pitch of a propeller may, for example, be fixed, manually variable to a few set positions, automatically variable (e.g. a "constant-speed" type), or any combination thereof. In an exemplary embodiment, propellers for an aircraft may be designed to be fixed to their hub at an angle similar to the thread on a screw makes an angle to the shaft; this angle may be referred to as a pitch or pitch angle which will determine the speed of the forward movement as the blade rotates.

Still referencing FIG. 3, and in an embodiment, a propulsor can include a thrust element which may be integrated into the propulsor. The thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

Still referring to FIG. 3, a propulsor may include a pusher component. As used in this disclosure a "pusher component" is a component that pushes and/or thrusts an aircraft through a medium. As a non-limiting example, pusher component may include a pusher propeller, a paddle wheel, a pusher motor, a pusher propulsor, and the like. Pusher component may be configured to produce a forward thrust. As used in this disclosure a "forward thrust" is a thrust that forces aircraft through a medium in a horizontal direction, wherein a horizontal direction is a direction parallel to the longitudinal axis. For example, forward thrust may include a force of 1145 N to force aircraft to in a horizontal direction along the longitudinal axis. As a further non-limiting example, pusher component may twist and/or rotate to pull air behind it and, at the same time, push aircraft 300 forward with an equal amount of force. In an embodiment, and without limitation, the more air forced behind aircraft, the greater the thrust force with which aircraft 300 is pushed horizontally will be. In another embodiment, and without limitation, forward thrust may force aircraft 300 through the medium of relative air. Additionally or alternatively, plurality of propulsor may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components.

Still referring to FIG. 3, and in one or more embodiments, propulsor 304 includes a motor. The motor may include, without limitation, any electric motor, where an electric motor is a device that converts electrical energy into mechanical energy, for instance by causing a shaft to rotate. A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers (not shown) or other components for regulating motor speed, rotation direction, torque, and the like.

Still referring to FIG. 3, in some embodiments aircraft 300 may include at least a boom 108. In some embodiments, the at least a boom 108 may include a plurality of the at least a boom 108. As a non-limiting example, aircraft 300 may include two the at least a boom 108 as shown in FIG. 3. In some embodiments, the at least a boom 108 may be configured to carry propulsor 304. In some embodiments, propulsor 304 may include a plurality of propulsors 304. In some embodiments, the at least a boom 108 may be configured to support tail 312. In some embodiments, the at least a boom 108 may be attached to tail 312 as shown in FIG. 3. In some embodiments, tail 312 may include an elevator. An "elevator," as used in this disclosure, is a flight control surface that controls movement about the lateral axis of an aircraft, wherein the movement may be but not limited to pitch. In some embodiments, tail 312 may include a stabilizer. In some embodiments, the elevator may be mounted on trailing edge of horizontal stabilizer. As used in this disclosure, an aircraft "stabilizer" is an aerodynamic surface, typically including one or more movable control surfaces, that provides longitudinal pitch such as but not limited to a horizontal stabilizer and/or directional yaw such as but not limited to a vertical stabilizer stability and control. A stabilizer may feature a fixed or adjustable structure on which any movable control surfaces are hinged, or it may itself be a fully movable surface such as a stabilizer. In some embodiments, tail 312 may include a rudder. As used in this disclosure, a "rudder" is a control surface of an aircraft that is used to turn the aircraft's nose right or left.

Still referring to FIG. 3, propulsor 304 may include two or more blades 412. In an embodiment, a propulsor 304 may include an advancing blade a retreating blade. An advancing blade moves towards a nose 308 of an aircraft and a retreating blade moves towards a tail 312 of an aircraft. Blades may be solid blades. As used herein, a "solid blade" is a blade such that is substantially rigid and not susceptible to bending during flight. Blade pitch on solid blades may not be individually adjustable, therefore cyclic controls may only control the blade pitch as a whole. Specifically, the advancing blade and the retreating blade may be considered a solid blade together and may not be individually adjusted and may be adjusted as a whole. As used herein, "blade pitch" is the angle of a blade.

Still referring to FIG. 3, in some embodiments, aircraft 300 may include airframe. As used in this disclosure, "airframe" is a mechanical structure of an aircraft. In one or more embodiments, airframe includes a structural element configured to provide support and shape to aircraft 300. The airframe structure may include one or more skid plates and/or landing gears. The airframe structure may include a truss, monocoque construction, semi-monocoque construction, and the like thereof. The airframe structure may be comprised of one or more metallic compounds such as aluminum, steel, titanium, composites, and the like thereof. In one or more embodiments, airframe may include a plurality of structural elements. In other embodiments, the airframe may include a plurality of airframes.

Still referring to FIG. 3, aircraft 300 may include a fuselage 316. In one or more embodiments, and as used in this disclosure, a "fuselage" is a main body of an aircraft. In one or more embodiments, fuselage 316 may include the entirety of aircraft except for a cockpit, nose, wings, empennage, nacelles, flight components, such as any and all control surfaces and propulsors. Fuselage 316 may contain a payload of aircraft. In one or more embodiments, airframe may form fuselage 316. For example, and without limitation, one or more structural elements of airframe may be used to form fuselage 316. For the purposes of this disclosure, "structural elements" include elements that physically support a shape and structure of an aircraft. Structural elements may take a plurality of forms, alone or in combination with other types. In one or more embodiments, a structural element may include a carbon fiber composite structure, as previously mentioned. The carbon fiber composite structure is configured to include high stiffness, high tensile strength, low weight to strength ratio, high chemical resistance, high temperature tolerance, and low thermal expansion. In one or more embodiments, a carbon fiber composite may include one or more carbon fiber structures comprising a plastic resin and/or graphite. For example, a carbon fiber composite may be formed as a function of a binding carbon fiber to a thermoset resin, such as an epoxy, and/or a thermoplastic polymer, such as polyester, vinyl ester, nylon, and the like thereof. Structural element may vary depending on a construction type of aircraft. For example, and without limitation, structural element may vary if forming the portion of aircraft that is fuselage 316. Fuselage 316 may include a truss structure. A truss structure may be used with a lightweight aircraft and include welded steel tube trusses. A "truss," as used in this disclosure, is an assembly of beams that create a rigid structure, often in combinations of triangles to create three-dimensional shapes. A truss structure may alternatively comprise wood construction in place of steel tubes, or a combination thereof. In embodiments, structural elements may include steel tubes and/or wood beams.

Still referring to FIG. 3, in one or more embodiments, fuselage 316 may include and/or be constructed using geodesic construction. Geodesic structural elements may include stringers wound about formers (which may be alternatively called station frames) in opposing spiral directions. A "stringer," as used in this disclosure, is a general structural element that may include a long, thin, and rigid strip of metal or wood that is mechanically connected to and spans a distance from station frame to station frame to create an internal skeleton on which to mechanically connect aircraft skin. A former (or station frame) may include a rigid structural element that is disposed along a length of an interior of aircraft fuselage 316 orthogonal to a longitudinal (nose to tail) axis of aircraft and may form a general shape of fuselage 316. A former may include differing cross-sectional shapes at differing locations along fuselage 316, as the former is the structural element that informs the overall shape of a fuselage 316 curvature. In embodiments, the skin may be anchored to formers and strings such that an outer mold line (OML) of a volume encapsulated by formers and stringers comprises the same shape as aircraft when installed. In other words, former(s) may form a fuselage's ribs, and the stringers may form the interstitials between such ribs. The spiral orientation of stringers about formers may provide uniform robustness at any point on fuselage 316 such that if a portion sustains damage, another portion may remain largely unaffected. Aircraft skin may be attached to underlying stringers and formers and may interact with a fluid, such as air, to generate lift and perform maneuvers.

Still referring to FIG. 3, in some embodiments, aircraft 300 may include airframe is a mechanical structure of an aircraft 300. The airframe may include a fuselage 316, a tail 312, a wing 104, and/or landing gear, a boom 108, and the like. In one or more embodiments, the airframe includes a structural element configured to provide support and shape to aircraft 300. The airframe structure may include one or more skid plates and/or landing gears. The airframe structure may include a truss, monocoque construction, semi-monocoque construction, and the like thereof. The airframe structure may be comprised of one or more metallic compounds such as aluminum, steel, titanium, composites, and the like thereof. In one or more embodiments, airframe may include a plurality of structural elements. In other embodiments, the airframe may include a plurality of airframes. In one or more embodiments, airframe may include various types of construction. For instance, and without limitation, the airframe may include a monocoque construction, semi-monocoque construction, a truss with canvas construction, or a truss with corrugated plate construction. For example, and without limitation, fuselage 316 may include and/or be constructed using monocoque construction. Monocoque construction may include a primary structure that forms a shell, such as skin, and supports physical loads. Monocoque fuselages are fuselages in which aircraft skin or shell is also the primary structure. In monocoque construction, aircraft skin may support tensile and compressive loads within itself and may, in some exemplary embodiments, be characterized by the absence of internal structural elements. The aircraft skin in this construction method is rigid and can sustain its shape with no structural assistance from underlying skeleton-like elements. In one or more non-limiting embodiments, a monocoque fuselage may include an aircraft skin made from plywood layered in varying grain directions, epoxy-impregnated fiberglass, carbon fiber, or any combination thereof.

Still referring to FIG. 3, in other embodiments, an airframe may include a semi-monocoque construction. A semi-monocoque construction, as used in this disclosure, is a partial monocoque construction, where a monocoque construction is described above detail. In a semi-monocoque construction, fuselage 316 may derive some structural support from stressed the skin and some structural support from an underlying frame structure made of structural elements. Formers or station frames can be seen running transverse to the long axis of fuselage 316 with circular cutouts which are generally used in real-world manufacturing for weight savings and for the routing of electrical harnesses and other modern on-board systems. In a semi-monocoque construction, stringers are thin, long strips of material that run parallel to fuselage's long axis. Stringers may be mechanically connected to formers permanently, such as with rivets. The skin may be mechanically connected to stringers and formers permanently, such as by rivets as well. A person of ordinary skill in the art will appreciate, upon reviewing the entirety of this disclosure, that there are numerous methods for mechanical fastening of components like screws, nails, dowels, pins, anchors, adhesives like glue or epoxy, or bolts and nuts, to name a few. A subset of fuselage under the umbrella of semi-monocoque construction includes unibody vehicles. Unibody, which is short for "unitized body" or alternatively "unitary construction", vehicles are characterized by a construction in which the body, floor plan, and chassis form a single structure. A unibody may be characterized by internal structural elements like formers and stringers being constructed in one piece, integral to aircraft skin as well as any floor construction like a deck.

Still referring to FIG. 3, stringers and formers, which may account for the bulk of an aircraft structure excluding monocoque construction, may be arranged in a plurality of orientations depending on aircraft operation and materials. Stringers may be arranged to carry axial (tensile or compressive), shear, bending or torsion forces throughout their overall structure. Due to their connection to aircraft skin, aerodynamic forces exerted on aircraft skin will be transferred to stringers. A location of stringers greatly informs the type of forces and loads applied to each and every stringer, all of which may be handled by material selection, cross-sectional area, and mechanical connecting methods of each member. A similar assessment may be made for formers. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

Figure 4:
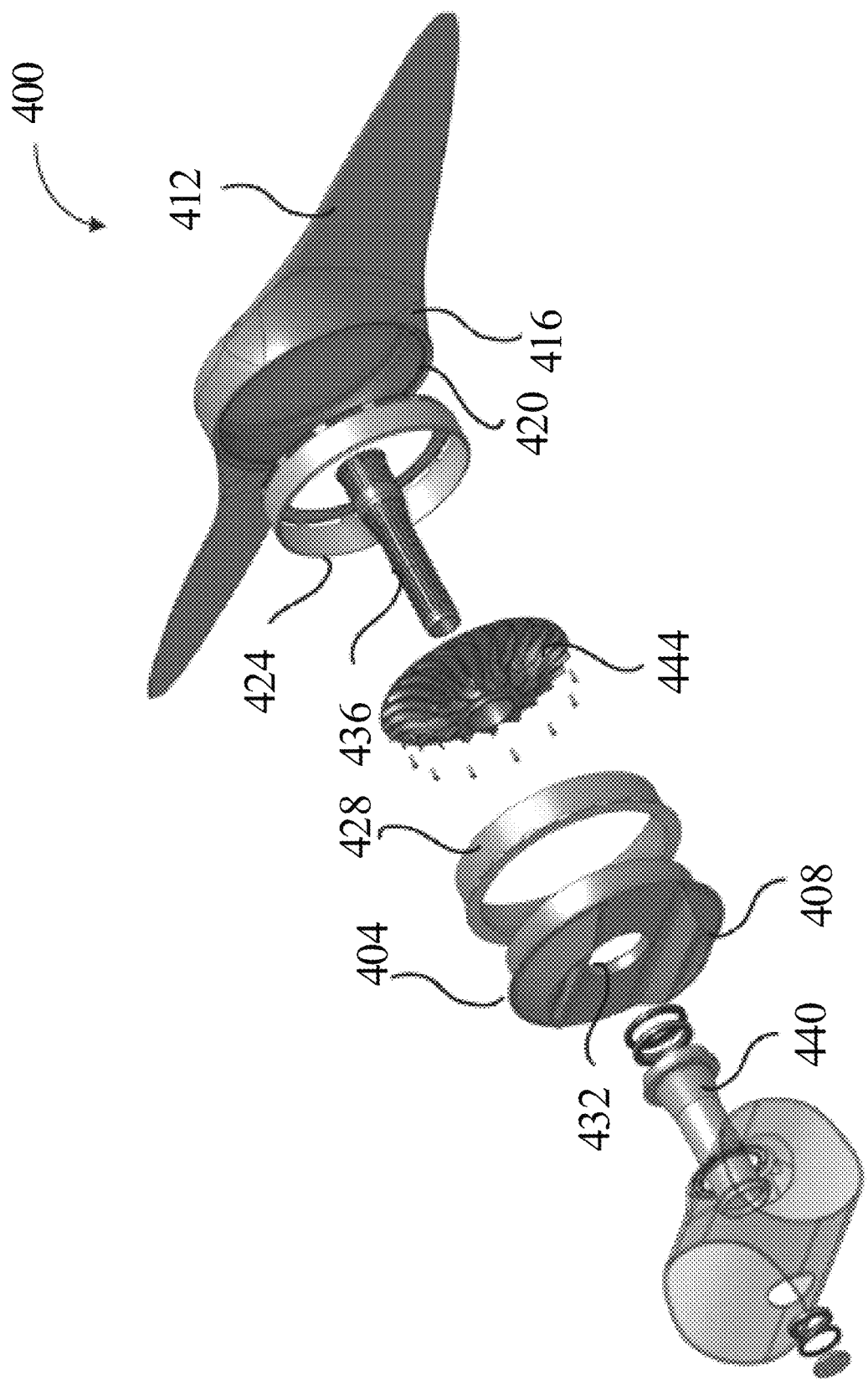
FIG. 4 is an exemplary embodiment of an integrated electric propulsion assembly.

Referring now to FIG. 4, an embodiment of an integrated electric propulsion assembly 400 is illustrated. Integrated electric propulsion assembly 400 may include at least a stator 404. Stator 404, as used herein, is a stationary component of a motor and/or motor assembly. In an embodiment, stator 404 includes at least a first magnetic element 408. As used herein, first magnetic element 408 is an element that generates a magnetic field. For example, first magnetic element 408 may include one or more magnets which may be assembled in rows along a structural casing component. Further, first magnetic element 408 may include one or more magnets having magnetic poles oriented in at least a first direction. The magnets may include at least a permanent magnet. Permanent magnets may be composed of, but are not limited to, ceramic, alnico, samarium cobalt, neodymium iron boron materials, any rare earth magnets, and the like. Further, the magnets may include an electromagnet. As used herein, an electromagnet is an electrical component that generates magnetic field via induction; the electromagnet may include a coil of electrically conducting material, through which an electric current flow to generate the magnetic field, also called a field coil of field winding. A coil may be wound around a magnetic core, which may include without limitation an iron core or other magnetic material. The core may include a plurality of steel rings insulated from one another and then laminated together; the steel rings may include slots in which the conducting wire will wrap around to form a coil. A first magnetic element 408 may act to produce or generate a magnetic field to cause other magnetic elements to rotate, as described in further detail below. Stator 404 may include a frame to house components including at least a first magnetic element 408, as well as one or more other elements or components as described in further detail below. In an embodiment, a magnetic field can be generated by a first magnetic element 408 and can comprise a variable magnetic field. In embodiments, a variable magnetic field may be achieved by use of an inverter, a controller, or the like. In an embodiment, stator 404 may have an inner and outer cylindrical surface; a plurality of magnetic poles may extend outward from the outer cylindrical surface of the stator. In an embodiment, stator 404 may include an annular stator, wherein the stator is ring-shaped. In an embodiment, stator 404 is incorporated into a DC motor where stator 404 is fixed and functions to supply the magnetic fields where a corresponding rotor, as described in further detail below, rotates.

Still referring to FIG. 4, integrated electric propulsion assembly 400 may include a propulsor. In embodiments, propulsor can include an integrated rotor. As used herein, a rotor is a portion of an electric motor that rotates with respect to a stator of the electric motor, such as stator 404. Propulsor 304 may be any device or component that consumes electrical power on demand to propel an aircraft or other vehicle while on ground and/or in flight. Propulsor 304 may include one or more propulsive devices. In an embodiment, propulsor 304 can include a thrust element which may be integrated into the propulsor. A thrust element may include any device or component that converts the mechanical energy of a motor, for instance in the form of rotational motion of a shaft, into thrust in a fluid medium. For example, a thrust element may include without limitation a marine propeller or screw, an impeller, a turbine, a pump-jet, a paddle or paddle-based device, or the like. As another non-limiting example, propulsor 304 may include an eight-bladed pusher propeller, such as an eight-bladed propeller mounted behind the engine to ensure the drive shaft is in compression. Persons skilled in the art, upon reviewing the entirety of this disclosure, will be aware of various devices that may be used as at least a thrust element. As used herein, a propulsive device may include, without limitation, a device using moving or rotating foils, including without limitation one or more rotors, an airscrew or propeller, a set of airscrews or propellers such as contra-rotating propellers, a moving or flapping wing, or the like.

Still referring to FIG. 4, in an embodiment, propulsor 304 may include at least a blade 412. As another non-limiting example, propulsor 304 may include an eight-bladed pusher propeller, such as an eight-bladed propeller mounted behind the engine to ensure the drive shaft is in compression. Persons skilled in the art, upon reviewing the entirety of this disclosure, will be aware of various devices that may be used as the propulsor. In an embodiment, when propulsor 304 twists and pulls air behind it, it will, at the same time, push the aircraft forward with an equal amount of force. The more air pulled behind the aircraft, the more the aircraft is pushed forward.

Still referring to FIG. 4, in an embodiment, thrust element may include a helicopter rotor incorporated into propulsor 304. A helicopter rotor, as used herein, may include one or more blade or wing elements driven in a rotary motion to drive fluid medium in a direction axial to the rotation of the blade or wing element. Its rotation is due to the interaction between the windings and magnetic fields which produces a torque around the rotor's axis. A helicopter rotor may include a plurality of blade or wing elements.

Still referring to FIG. 4, propulsor 304 can include a hub 416 rotatably mounted to stator 404. Rotatably mounted, as described herein, is functionally secured in a manner to allow rotation. Hub 416 is a structure which allows for the mechanically connected of components of the integrated rotor assembly. In an embodiment, hub 416 can be mechanically connected to propellers or blades. In an embodiment, hub 416 may be cylindrical in shape such that it may be mechanically joined to other components of the rotor assembly. Hub 416 may be constructed of any suitable material or combination of materials, including without limitation metal such as aluminum, titanium, steel, or the like, polymer materials or composites, fiberglass, carbon fiber, wood, or any other suitable material. Hub 416 may move in a rotational manner driven by interaction between stator and components in the rotor assembly. Persons skilled in the art, upon reviewing the entirety of this disclosure, will be aware of various structures that may be used as or included as hub 416, as used and described herein.

Still referring to FIG. 4, propulsor 304 may include a second magnetic element 420, which may include one or more further magnetic elements. Second magnetic element 420 generates a magnetic field designed to interact with first magnetic element 408. Second magnetic element 420 may be designed with a material such that the magnetic poles of at least a second magnetic element are oriented in an opposite direction from first magnetic element 408. In an embodiment, second magnetic element 420 may be affixed to hub 416. Affixed, as described herein, is the attachment, fastening, connection, and the like, of one component to another component. For example, and without limitation, affixed may include bonding the second magnetic element 420 to hub 416, such as through hardware assembly, spot welding, riveting, brazing, soldering, glue, and the like. Second magnetic element 420 may include any magnetic element suitable for use as a first magnetic element 408. For instance, and without limitation, second magnetic element may include a permanent magnet and/or an electromagnet. Second magnetic element 420 may include magnetic poles oriented in a second direction opposite of the orientation of the poles of first magnetic element 408. In an embodiment, electric propulsion assembly 400 includes a motor assembly incorporating stator 404 with a first magnet element and second magnetic element 420. First magnetic element 408 includes magnetic poles oriented in a first direction, a second magnetic element includes a plurality of magnetic poles oriented in the opposite direction than the plurality of magnetic poles in the first magnetic element 408.

Still referring to FIG. 4, second magnetic element 420 may include a plurality of magnets attached to or integrated in hub 416. In an embodiment, hub 416 may incorporate structural elements of the rotor assembly of the motor assembly. As a non-limiting example hub 416 may include a motor inner magnet carrier 424 and motor outer magnet carrier 428 incorporated into the hub 416 structure. In an embodiment motor inner magnet carrier 424 and motor outer magnet carrier 428 may be cylindrical in shape. In an embodiment, motor inner magnet carrier 424 and motor out magnet carrier 416 may be any shape that would allow for a fit with the other components of the rotor assembly. In an embodiment, hub 416 may be short and wide in shape to reduce the profile height of the rotating assembly of electric propulsion assembly 400. Reducing the profile assembly height may have the advantage of reducing drag force on the external components. In an embodiment, hub 416 may also be cylindrical in shape so that fitment of the components in the rotor assembly are structurally rigid while leaving hub 416 free to rotate about stator.

Still referring to FIG. 4, in an embodiment, motor outer magnet carrier 428 may have a slightly larger diameter than motor inner magnet carrier 424, or vice-versa. First magnetic element 408 may be a productive element, defined herein as an element that produces a varying magnetic field. Productive elements will produce magnetic field that will attract and other magnetic elements, including a receptive element. Second magnetic element may be a productive or receptive element. A receptive element will react due to the magnetic field of a first magnetic element 408. In an embodiment, first magnetic element 408 produces a magnetic field according to magnetic poles of first magnetic element 408 oriented in a first direction. Second magnetic element 420 may produce a magnetic field with magnetic poles in the opposite direction of the first magnetic field, which may cause the two magnetic elements to attract one another. Receptive magnetic element may be slightly larger in diameter than the productive element. Interaction of productive and receptive magnetic elements may produce torque and cause the assembly to rotate. Hub 416 and rotor assembly may both be cylindrical in shape where rotor may have a slightly smaller circumference than hub 416 to allow the joining of both structures. Coupling of hub 416 to stator 404 may be accomplished via a surface modification of either hub 416, stator 404 or both to form a locking mechanism. Coupling may be accomplished using additional nuts, bolts, and/or other fastening apparatuses. In an embodiment, an integrated rotor assembly as described above reduces profile drag in forward flight for an electric aircraft. Profile drag may be caused by a number of external forces that the aircraft is subjected to. By incorporating a the propulsor into hub 416, a profile of integrated electric propulsion assembly 400 may be reduced, resulting in a reduced profile drag, as noted above. In an embodiment, the rotor, which includes motor inner magnet carrier 424, motor outer magnet carrier 428, the propulsor is incorporated into hub 416 to become one integrated unit. In an embodiment, inner motor magnet carrier 412 rotates in response to a magnetic field. The rotation causes hub 416 to rotate. This unit can be inserted into integrated electric propulsion assembly 400 as one unit. This enables ease of installation, maintenance, and removal.

Still referring to FIG. 4, stator 404 may include a through-hole 432. Through-hole 432 may provide an opening for a component to be inserted through to aid in attaching propulsor with integrated rotor to stator. In an embodiment, through-hole 432 may have a round or cylindrical shape and be located at a rotational axis of stator 404. Hub 416 may be mounted to stator 404 by means of a shaft 436 rotatably inserted though through hole 432. Through-hole 432 may have a diameter that is slightly larger than a diameter of shaft 436 to allow shaft 436 to fit through through-hole 432 to connect stator 404 to hub 416. Shaft 436 may rotate in response to rotation of the propulsor.

Still referring to FIG. 4, integrated electric propulsion assembly 400 may include a bearing cartridge 440. Bearing cartridge 440 may include a bore. Shaft 436 may be inserted through the bore of bearing cartridge 440. Bearing cartridge 440 may be attached to a structural element of a vehicle. Bearing cartridge 440 functions to support the rotor and to transfer the loads from the motor. Loads may include, without limitation, weight, power, magnetic pull, pitch errors, out of balance situations, and the like. A bearing cartridge 440 may include a bore. a bearing cartridge 440 may include a smooth metal ball or roller that rolls against a smooth inner and outer metal surface. The rollers or balls take the load, allowing the device to spin. a bearing may include, without limitation, a ball bearing, a straight roller bearing, a tapered roller bearing or the like. a bearing cartridge 440 may be subject to a load which may include, without limitation, a radial or a thrust load. Depending on the location of bearing cartridge 440 in the assembly, it may see all of a radial or thrust load or a combination of both. In an embodiment, bearing cartridge 440 may join integrated electric propulsion assembly 400 to a structure feature. A bearing cartridge 440 may function to minimize the structural impact from the transfer of bearing loads during flight and/or to increase energy efficiency and power of propulsor. a bearing cartridge 440 may include a shaft and collar arrangement, wherein a shaft affixed into a collar assembly. A bearing element may support the two joined structures by reducing transmission of vibration from such bearings. Roller (rolling-contact) bearings are conventionally used for locating and supporting machine parts such as rotors or rotating shafts. Typically, the rolling elements of a roller bearing are balls or rollers. In general, a roller bearing is a is type of anti-friction bearing; a roller bearing functions to reduce friction allowing free rotation. Also, a roller bearing may act to transfer loads between rotating and stationary members. In an embodiment, bearing cartridge 440 may act to keep a the propulsor and components intact during flight by allowing integrated electric propulsion assembly 400 to rotate freely while resisting loads such as an axial force. In an embodiment, bearing cartridge 440 includes a roller bearing incorporated into the bore. a roller bearing is in contact with propulsor shaft 436. Stator 404 is mechanically coupled to inverter housing 440. Mechanically coupled may include a mechanical fastening, without limitation, such as nuts, bolts or other fastening device. Mechanically coupled may include welding or casting or the like. Inverter housing contains a bore which allows insertion by propulsor shaft 436 into bearing cartridge 440.

Still referring to FIG. 4, electric propulsion assembly 400 may include a motor assembly incorporating a rotating assembly and a stationary assembly. Hub 416, motor inner magnet carrier 424 and propulsor shaft 436 may be incorporated into the rotor assembly of electric propulsion assembly 400 which make up rotating parts of electric motor, moving between the stator poles and transmitting the motor power. As one integrated part, the rotor assembly may be inserted and removed in one piece. Stator 404 may be incorporated into the stationary part of the motor assembly. Stator and rotor may combine to form an electric motor. In embodiment, an electric motor may, for instance, incorporate coils of wire which are driven by the magnetic force exerted by a first magnetic field on an electric current. The function of the motor may be to convert electrical energy into mechanical energy. In operation, a wire carrying current may create at least a first magnetic field with magnetic poles in a first orientation which interacts with a second magnetic field with magnetic poles oriented in the opposite direction of the first magnetic pole direction causing a force that may move a rotor in a direction. For example, and without limitation, a first magnetic element 408 in electric propulsion assembly 400 may include an active magnet. For instance, and without limitation, a second magnetic element may include a passive magnet, a magnet that reacts to a magnetic force generated by a first magnetic element 408. In an embodiment, a first magnet positioned around the rotor assembly, may generate magnetic fields to affect the position of the rotor relative to the stator 404. A controller may have an ability to adjust electricity originating from a power supply and, thereby, the magnetic forces generated, to ensure stable rotation of the rotor, independent of the forces induced by the machinery process. Electric propulsion assembly 400 may include an impeller 444 coupled with the shaft 436. An impeller, as described herein, is a rotor used to increase or decrease the pressure and flow of a fluid and/or air. Impeller 444 may function to provide cooling to electric propulsion assembly 400. Impeller 444 may include varying blade configurations, such as radial blades, non-radial blades, semi-circular blades and airfoil blades. Impeller 414 may further include single and/or double-sided configurations.

Figure 5:
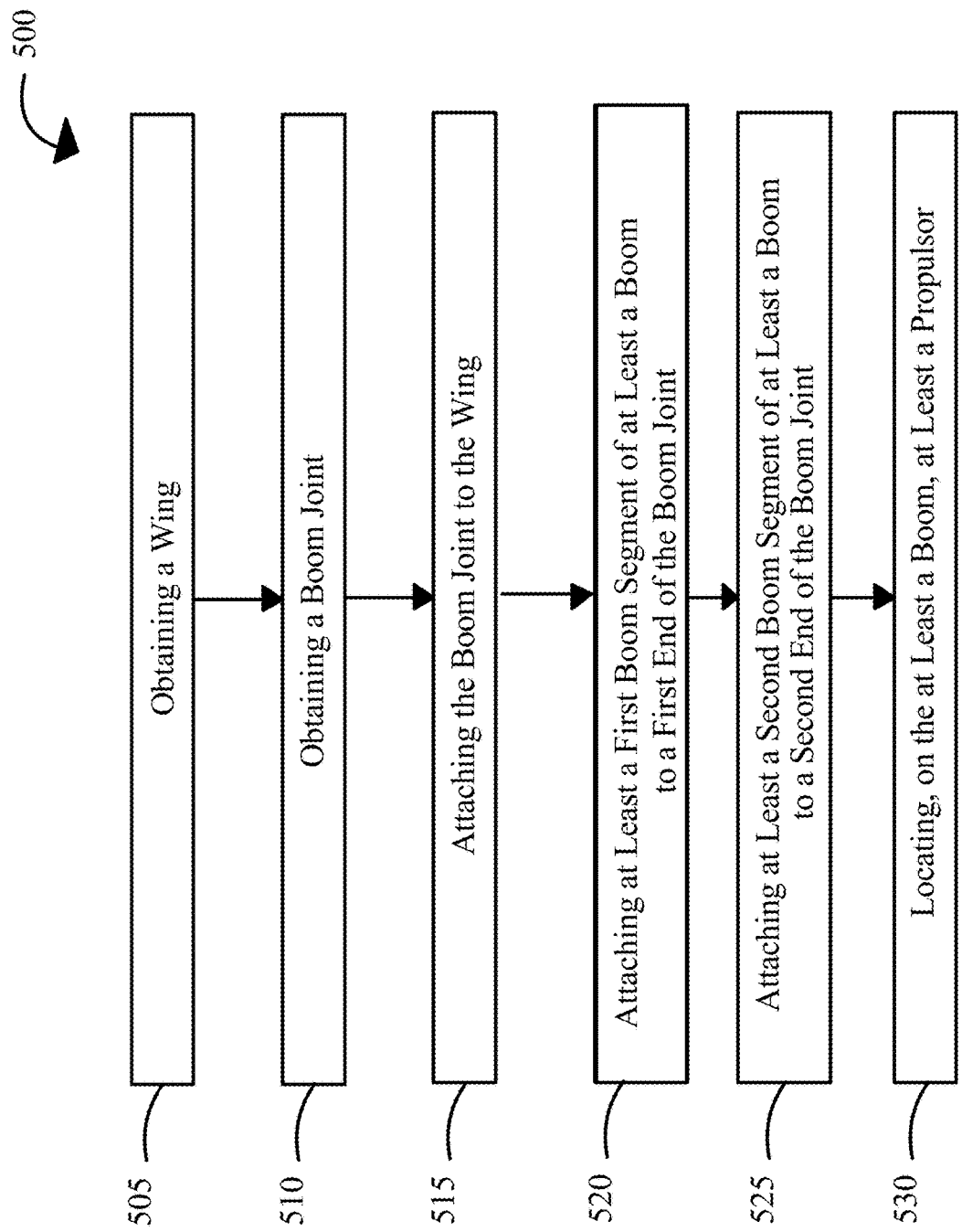
FIG. 5 is a flow diagram of a method of manufacturing a structure of an aircraft.

Now referring to FIG. 5, method 500 of manufacturing a structure of an electric aircraft is illustrated. Method 500 may include step 505 of obtaining a wing, wherein the wing is a single component that runs from a left side of the electric aircraft to a right side of the electric aircraft. The wing may include an airfoil. This may be implemented as disclosed with reference to FIG. 1-4.

Still referring to FIG. 5, method 500 may include step 510 of obtaining a boom joint. Method 500 may include step 515 of attaching the boom joint to the wing. In some embodiments, method 500 may further include orienting the at least a boom substantially perpendicular to a wingspan of the wing. In some embodiments, the boom joint may include a hole. In some embodiments, method 500 may further include mating the hole of the boom joint with the wing by inserting the boom joint to the wing using the hole. In some embodiments, the hole may be an airfoil shape corresponding to the airfoil of the wing. In some embodiments, the boom joint may include two pieces. In some embodiments, the two pieces of the boom joint may include an upper joint wherein the upper joint may include a top portion of the boom join. In some embodiments, the two pieces of the boom joint may include a lower joint wherein the lower joint may include a bottom portion of the boom joint. In some embodiments, method 500 may further include attaching the upper joint to a top surface of the wing and attaching the lower joint to a bottom surface of the wing. This may be implemented as disclosed with reference to FIG. 1-4.

Still referring to FIG. 5, method 500 may include step 520 of attaching at least a first boom segment to a first end of the boom joint. Method 500 may include step 525 of attaching at least a second boom segment to a second end of the boom joint. In some embodiments, method 500 may further include mechanically coupling the boom joint and the wing using a coupling material. Method 500 may include step 530 of locating, on the at least a boom, at least a propulsor. In some embodiments, the at least a propulsor may be a lift propulsor. In some embodiments, the at least a boom may include a cylindrical body. In some embodiments, method 500 may further include attaching the at least a boom to at least a portion of a tail of the electric aircraft. This may be implemented as disclosed in reference to FIG. 1-4.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments according to this disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A structure of an electric aircraft, wherein the structure comprises:
    a wing, wherein the wing is a single component that runs from a left side of the electric aircraft to a right side of the electric aircraft and the wing comprises an airfoil; and
    a boom configured to carry a propulsor and comprising:
        a boom joint attached to the wing, wherein the boom joint comprises a hole, and wherein the hole comprises an airfoil shape configured to receive the airfoil of the wing;
        a first boom segment attached to a first end of the boom joint; and
        a second boom segment attached to a second end of the boom joint.

2. The structure of claim 1, wherein the boom is oriented substantially perpendicular to a wingspan of the wing.

3. The structure of claim 1, wherein the boom further comprises a cylindrical body.

4. The structure of claim 1, wherein the propulsor is a lift propulsor.

5. The structure of claim 1, wherein the hole of the boom joint is configured to mate with the wing by inserting the boom joint onto the wing using the hole.

6. The structure of claim 1, wherein the boom joint further comprises two pieces, the two pieces comprising:
    an upper joint comprising a top portion of the boom joint; and
    a lower joint comprising a bottom portion of the boom joint.

7. The structure of claim 6, wherein the upper joint is attached to a top surface of the wing and the lower joint is attached to a bottom surface of the wing.

8. The structure of claim 1, wherein the boom joint and the wing are mechanically coupled using a coupling material.

9. The structure of claim 1, wherein the boom is attached to a portion of a tail of the electric aircraft.

10. A method of manufacturing a structure of an electric aircraft, wherein the method comprises:
    obtaining a wing, wherein the wing is a single component that runs from a left side of the electric aircraft to a right side of the electric aircraft and the wing comprises an airfoil;
    obtaining a boom joint;

attaching the boom joint to the wing, wherein the boom joint comprises a hole, and wherein the hole comprises an airfoil shape configured to receive the airfoil of the wing;

attaching a first boom segment of a boom to a first end of the boom joint;

attaching a second boom segment of the boom to a second end of the boom joint; and locating, on the boom, a propulsor.

11. The method of claim 10, further comprising:

orienting the boom substantially perpendicular to a wingspan of the wing.

12. The method of claim 10, wherein the boom comprises a cylindrical body.

13. The method of claim 10, wherein the propulsor is a lift propulsor.

14. The method of claim 13, further comprising mating the hole of the boom joint with the wing by inserting the boom joint onto the wing using the hole.

15. The method of claim 10, wherein the boom joint further comprises two pieces, the two pieces comprising:

an upper joint comprising a top portion of the boom joint; and a lower joint comprising a bottom portion of the boom joint.

16. The method of claim 15, further comprising:

attaching the upper joint to a top surface of the wing; and attaching the lower joint to a bottom surface of the wing.

17. The method of claim 10, further comprising:

mechanically coupling the boom joint and the wing using a coupling material.

18. The method of claim 10, further comprising:

attaching the boom to a portion of a tail of the electric aircraft.

19. The structure of claim 6, wherein the upper joint further comprises a curve in a shape of a top surface of the wing.

20. The method of claim 15, wherein the upper joint further comprises a curve in a shape of a top surface of the wing.

\* \* \* \* \*